(12) United States Patent
Tran et al.

(10) Patent No.: US 11,496,454 B2
(45) Date of Patent: Nov. 8, 2022

(54) SYSTEM AND METHOD FOR PROVIDING COMPREHENSIVE REMOTE AUTHORIZED ACCESS TO MULTIPLE EQUIPMENT IN A DATACENTER

(71) Applicant: DELL PRODUCTS, LP, Round Rock, TX (US)

(72) Inventors: My Tran, Austin, TX (US); Sudhir Vittal Shetty, Cedar Park, TX (US); Michael Emery Brown, Austin, TX (US); Marshal F. Savage, Austin, TX (US); Jeffrey M. Lairsey, Round Rock, TX (US); Joshua M Pennell, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 16/263,712

(22) Filed: Jan. 31, 2019

(65) Prior Publication Data
US 2020/0252388 A1    Aug. 6, 2020

(51) Int. Cl.
*H04L 9/40*    (2022.01)
*H04L 9/32*    (2006.01)
*G06F 21/41*   (2013.01)

(52) U.S. Cl.
CPC .......... *H04L 63/0815* (2013.01); *G06F 21/41* (2013.01); *H04L 9/3213* (2013.01); *H04L 63/0428* (2013.01); *H04L 63/105* (2013.01)

(58) Field of Classification Search
CPC ............. H04L 63/0815; H04L 63/0428; H04L 63/105; H04L 9/3213; G06F 21/41; G06F 21/335
See application file for complete search history.

(56) References Cited

U.S. PATENT DOCUMENTS 9,225,670 B2    12/2015  Janardhanan
2013/0305054 A1  11/2013  Burchett et al.
(Continued)

FOREIGN PATENT DOCUMENTS

CN    106332127 A  *  1/2017  ........... H04W 24/02
JP    2008054102 A  *  3/2008

OTHER PUBLICATIONS

L. A. Ramalho et al., "Development of an Intelligent Platform Management controller for the Pulsar IIb," 2015 IEEE Nuclear Science Symposium and Medical Imaging Conference (NSS/MIC), San Diego, CA, 2015, pp. 1-2, doi: 10.1109/NSSMIC.2015.7581788. (Year: 2015).*

(Continued)

*Primary Examiner* — Michael R Vaughan
(74) *Attorney, Agent, or Firm* — Larson Newman, LLP

(57) ABSTRACT

An information handling system for providing comprehensive remote authorized access to multiple equipment in a datacenter. A mobile device security credential is first authenticated before access information is configured in the mobile device using a short-range wireless interface. The configured access information is mapped to the equipment and the corresponding access token and encryption keys from the equipment are received by the mobile device. The mobile device uses the access token and the encryption keys to simultaneously access the equipment through a long-range wireless interface. The simultaneous access includes parallel accessing of the equipment at a next accessing instance without requiring re-authentication. With the accessed equipment, the mobile device manages the accessed equipment based on the configured access information.

19 Claims, 4 Drawing Sheets

(56) References Cited

U.S. PATENT DOCUMENTS

| | | | |
|---|---|---|---|
| 2014/0331060 A1* | 11/2014 | Hayton | G06F 21/31 |
| | | | 713/186 |
| 2015/0089221 A1* | 3/2015 | Taylor | H04W 12/08 |
| | | | 713/168 |
| 2016/0019746 A1 | 1/2016 | Lyons et al. | |
| 2016/0092696 A1* | 3/2016 | Guglani | G06F 21/335 |
| | | | 726/26 |
| 2017/0126685 A1* | 5/2017 | Taylor | G06F 21/6209 |
| 2017/0134223 A1* | 5/2017 | Ahmed | H04L 41/28 |
| 2018/0278468 A1 | 9/2018 | Rao et al. | |

OTHER PUBLICATIONS

I. Indu and P.M. Rubesh Anand. "Identity and Access Management for Cloud Web Services", in proc. Recent Advances in Intelligent Computational Systems (RAICS), Trivandrum, 2015, pp. 406-410. (Year: 2015).*

Obinna Ethelbert†, Faraz Fatemi Moghaddam*,†, Philipp Wieder*, Ramin Yahyapour*,† 978-1-5386-2074-8/17 $31.00 © 2017 IEEE DOI 10.1109/FiCloud.2017.29 A JSON Token-Based Authentication and Access Management Schema for Cloud SaaS Applications (Year: 2017).*

* cited by examiner

SYSTEM AND METHOD FOR PROVIDING COMPREHENSIVE REMOTE AUTHORIZED ACCESS TO MULTIPLE EQUIPMENT IN A DATACENTER

FIELD OF THE DISCLOSURE

This disclosure generally relates to information handling systems, and more particularly relates to comprehensive remote authorized access to multiple equipment in a datacenter.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system provides comprehensive remote authorized access to multiple equipment in a datacenter by authenticating a connecting mobile device and configuring access information on the authenticated mobile device. The configured access information is mapped to the equipment and the corresponding access token and encryption keys from the equipment are received by the mobile device. The mobile device utilizes the access token and the encryption keys to simultaneously access the equipment. With the accessed equipment, the mobile device manages the equipment based on the configured access information.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
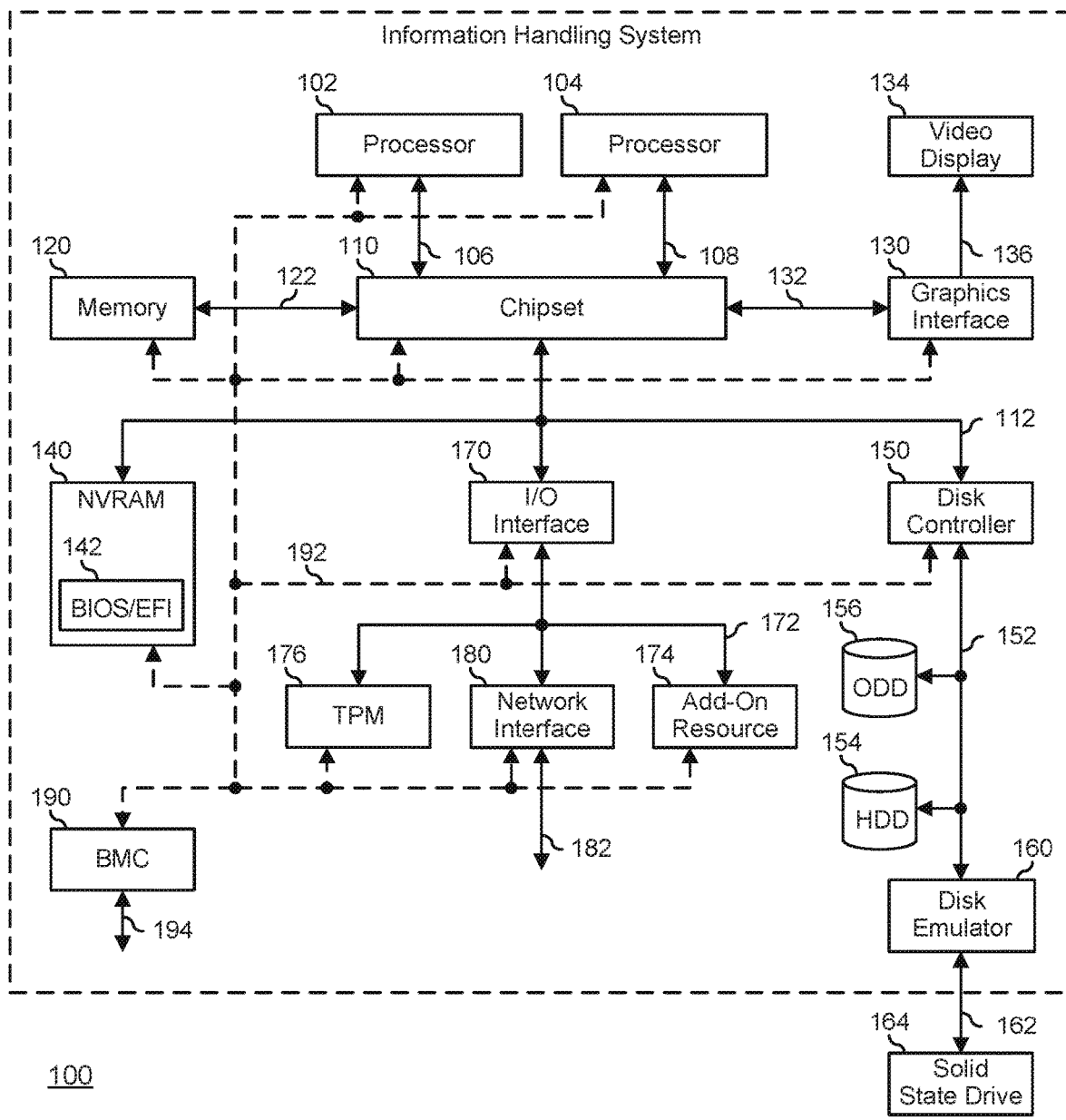
FIG. 1 is a block diagram of an information handling system according to an embodiment of the present disclosure.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, and a baseboard management controller (BMC) 190. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a network interface card (NIC) or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processors 102 and 104, which provides various management functions for information handling system 100. In an embodiment, BMC 190 may be responsible for granting access to an external device that may establish control of the elements to implement power management, cooling management, storage management, and the like. In this embodiment, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The term baseboard management controller (BMC) may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by Management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100. Thus BMC 190 can communicate with the remote management system via network interface 194 or the BMC can communicate with the external mobile device using its own transceiver circuitry while the resources or elements of information handling system 100 are powered off or at least in low power mode. Here, information can be sent from the remote management system or external mobile device to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, information handling system may be one of many hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

In an embodiment, multiple pieces of equipment in the datacenter may be remotely accessed simultaneously by a mobile device. This comprehensive remote authorized access may include parallel access to the equipment in a server rack. The server rack may include a next-gen modular chassis and other equipment installed in the server rack. The chassis, for example, may include installed equipment configured as modular blade servers.

Figure 2:
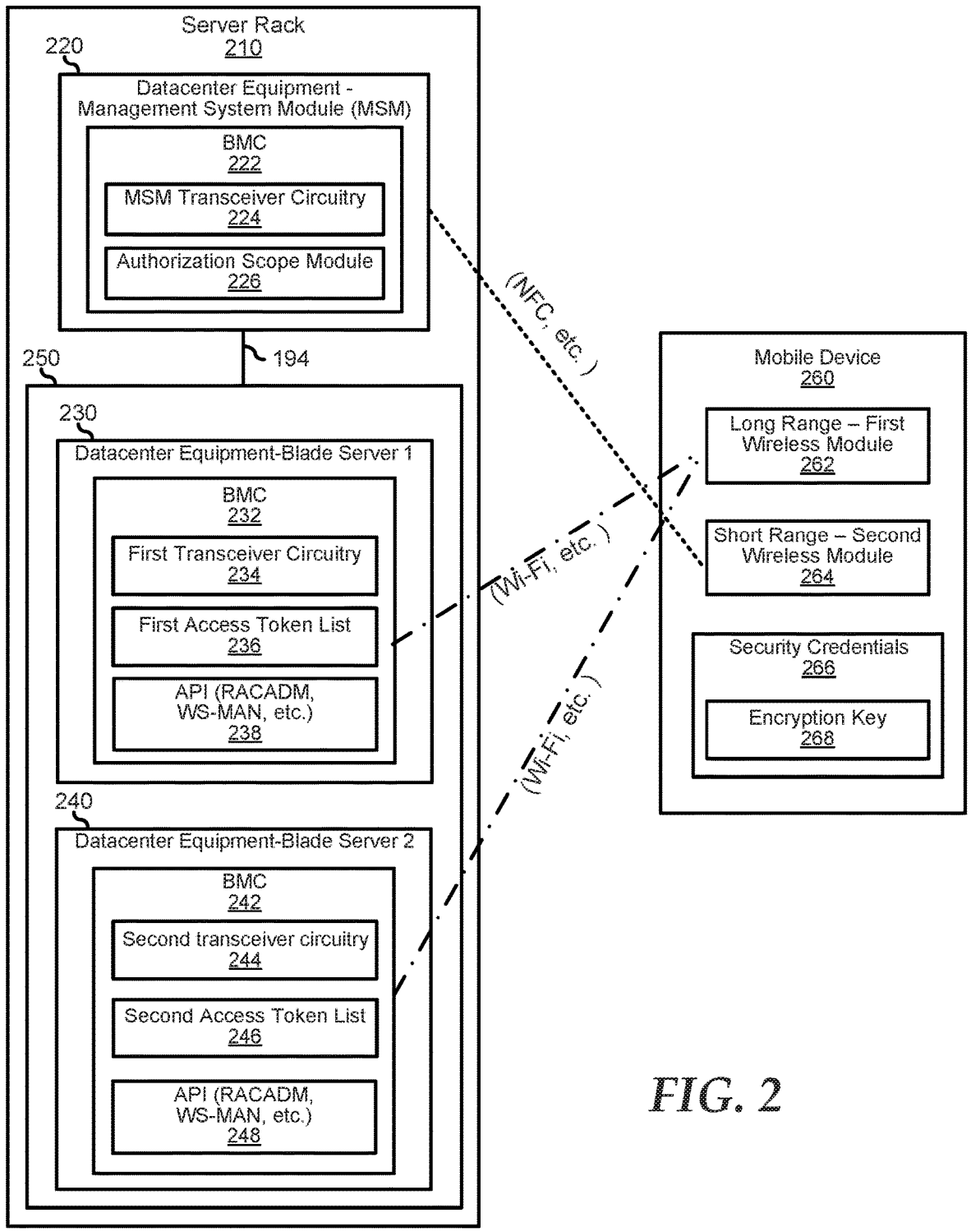
FIG. 2 is a block diagram of a portion of a datacenter according to an embodiment of the present disclosure.

FIG. 2 illustrates a portion of a datacenter 200 including a server rack 210 that includes multiple equipment 220, 230, and 240. Datacenter equipment 220 may be a stand-alone server while the datacenter equipment 230 and 240 may be modular blade servers inserted into a chassis 250 that is connected to the datacenter equipment 220 via network interface 194. Datacenter equipment 220 may be configured as a management system that facilitates secure and simultaneous access by a mobile device 260 to the blade servers in the chassis. For ease of illustration, only one server rack including one management system and the modular blade servers is shown. In an embodiment, the datacenter equipment 220 that represents a management system module (MSM) may not necessarily be disposed within the server rack. It can be located outside of the server rack and represents a centralized and unified processing resource for monitoring, managing, and maintaining the equipment through their respective BMCs.

Each of datacenter equipment 220, 230, and 240 includes a respective BMC 222, 232, and 242. BMCs 222, 232, and 242 may be connected together in a management network that represents a wired network, a wireless network, or a combination of wired and wireless networks as needed or desired. In an embodiment, BMCs 232 and 242 may transmit data or receive updates directly from datacenter equipment 220 or from the mobile device 260. The transmission of data and receiving of updates from datacenter equipment 220 or from the mobile device 260 may utilize the network interface 194 or wireless communications, respectively.

To establish simultaneous wireless communications with BMCs 232 and 242 of target datacenter equipment, BMC 222 may initially authenticate mobile device security credentials. After authentication, BMC 222 may configure access information on mobile device 260. In an embodiment, the access information includes scope of authority to change, view, manage, or control, configurations of the accessed target datacenter equipment. For a second and subsequent accessing of the target datacenter equipment by the mobile device, the access information may define a different scope of authority to manage the accessed datacenter equipment. In this manner, the comprehensive remote authorization is not limited to the simultaneous accessing of the datacenter equipment without need of re-authentication in the subsequent accessing, but may also include dynamic scope of authority at the subsequent accessing of the same or different target datacenter equipment. The comprehensive remote authorization may further facilitate power savings in the datacenter equipment when datacenter equipment that is outside the scope of authority of the mobile device to manage may remain in low power mode as needed or required. Based from the configured access information, the mobile device receives and utilizes an access token and encryption keys to simultaneously access some or all of the datacenter equipment.

In an embodiment where mobile device 260 is located within range of BMCs 222, 232, and 242, and the mobile device sends a polling signal to initially access datacenter equipment 230 and 240 through their respective BMCs, BMC 222 may be configured to facilitate the initial authentication or validation of the mobile device security credential. With the validated identification, BMC 222 may configure the access information that may be associated with the mobile device, map the configured access information to BMCs 232 and 242 of the targeted datacenter equipment, receive the access token and encryption keys from BMCs 232 and 242, and send the access token and the encryption keys to the mobile device. In this embodiment, the mobile device may use the access token and the encryption keys to simultaneously and initially access the targeted datacenter equipment. After the initial accessing, the mobile device may subsequently access the targeted datacenter equipment without re-authentication or re-validation of the mobile device security credential. With the accessed datacenter equipment, the mobile device may manage the equipment based on scope of authority or details of the access information that was configured into the mobile device during the initial access.

In another embodiment, the access token and encryption keys that correspond to the access information are preconfigured into the datacenter equipment 220. For example, the access information and the corresponding access token and encryption keys may be received from another management system in the datacenter, I/O interfaces, or a combination thereof. In this example, the stored access information, access token, and encryption keys, may be immediately available for sending to the authenticated mobile device such that the mapping step for the configured access information may be bypassed.

In another embodiment, the access information and the corresponding access token and encryption keys associated with a particular device are preconfigured in the datacenter equipment 230 and 240 that may be disposed, for example, within chassis 250. In another embodiment, BMCs 232 and 242 of the target datacenter equipment may directly perform the authentication of the mobile device security credential, configure access information, and send the corresponding access token and encryption keys to the authenticated mobile device. In this case, comprehensive remote authorized access may be obtained by the mobile device even though the datacenter equipment 220 is disposed outside of the server rack 210 and is out-of-range to perform the initial authentication of the mobile device, and configure access information, access token, and encryption keys, may be immediately available for sending to the authenticated mobile device such that the mapping step for the configured access information may be bypassed.

In an embodiment, the comprehensive remote authorization during the second and subsequent accessing instance may be limited by the configured access information in the mobile device. For example, the mobile device 260 goes out of range and comes back to within range of the server rack 210 to send another polling signal to access the previously accessed datacenter equipment. In this example, the comprehensive remote authorization to simultaneously access the previously accessed datacenter equipment without need of reauthorization enhances user experience. However, this subsequent accessing may depend upon the configured access information in the mobile device. If the configured access information changes scope of authority at each accessing instance, limits the number of times to access particular equipment, limits the elements to be managed or controlled at each access, etc., then the mobile device is bound to follow these limits as configured. The managed elements of the accessed datacenter equipment may include, for example, processors 102 and 104, memory 120, graphics interface 130, etc. of the information handling system. In this example, the elements to be managed by the mobile device may depend upon its scope of authority during a particular accessing instance.

BMC 222 includes MSM transceiver circuitry 224 and authorization scope module 226. BMC 232 includes first transceiver circuitry 234, first access token list 236, and API 238. BMC 242 includes second transceiver circuitry 244, second access token list 246, and API 248. Mobile device 260 includes first wireless module 262 for high bandwidth and long range wireless communications, second wireless module 264 for short range connection, and security credentials 266 with encryption key 268.

In an embodiment, each transceiver circuitry of the BMCs 222, 232, and 242 may facilitate a long range wireless interface connection between the respective datacenter equipment and the mobile device during high speed and high bandwidth transfer or receiving of data. For example, the long range and high bandwidth wireless connection includes Wi-Fi communication, worldwide interoperability for microwave access (WiMAX), fourth generation (4G) networks, etc. Furthermore, each of these transceivers may facilitate short range wireless interface connection during the authentication and sending of the access token and the encryption keys to the mobile device. Examples of short range wireless connections include NFC connections, Bluetooth communication, etc. In this embodiment, the short-range wireless interface is used during receiving and authentication of the mobile device security credential, configuring of the access information into the mobile device, and sending of the corresponding access token and encryption keys. The long-range wireless interface is used by the mobile device to transmit or receive data from the accessed datacenter equipment. In an embodiment, shifting from the short-range to long-range wireless communications may require the use of the access token and the encryption keys.

Authorization scope module 226 may store data that includes user identifications, mobile device identifications, access information to be configured on the mobile device, make and model of server rack, description of the chassis where modular blade servers are installed, number of datacenter equipment within the server rack, description and number of elements on the datacenter equipment, and the like. In an embodiment, datacenter equipment 220 may use the data from the authorization scope module to determine the access information to be associated with or configured to a particular mobile device after the authentication process is performed. Thereafter, datacenter equipment 220 maps the configured access information to datacenter equipment 230 or 240. In this embodiment, each of datacenter equipment 230 and 240 creates and sends back the corresponding access token lists and encryption key through network interface 194, such as a secured private virtual local access network (VLAN). The access token lists and encryption keys may be stored in the authorization scope module 226 and sent to the mobile device 260.

In another embodiment, authorization scope module 226 is preconfigured to include the access information and the corresponding access tokens and encryption key. In this embodiment, the BMC 222 need not perform mapping of configured access information but can merely authenticate the connecting mobile device, determine and configure the access information associated with the authenticated mobile device, and send the corresponding access token and encryption keys that may be used by the mobile device to simultaneously access the datacenter equipment.

Datacenter equipment 230 and 240 through their respective BMCs may communicate with datacenter equipment 220 using secured network interface 194. For example, network interface 194 includes a private VLAN that facilitates a secure channel for private communication between datacenter equipment in the server rack. In another example, the network interface can be Wi-Fi communication, Wi-MAX, or other secure wireless interface that provides higher bandwidth.

In an embodiment, each of the first access token list 236 and second access token list 246 may include a directory of mapped access information, generated access tokens that correspond to the mapped access information, encryption keys for each access token, and the like. The directory may further include a user's identity, mobile device identification, and other unique identifiers for the user and or mobile device. In this embodiment, the first and second access token lists may be used by respective datacenter equipment to decrypt the encryption keys that may be used by the mobile device at each accessing instance. Based from the decrypted keys, the datacenter equipment may allow the connected mobile device to manage the accessed datacenter equipment based upon the access information configured on the mobile device.

In an embodiment, the configured access information on the mobile device may include different scope of authority, privileges, etc. for different target datacenter equipment at each access. For example, the mobile device may perform data read and data write on the datacenter equipment 230 and 240 during the initial access but the mobile device can only perform data read on datacenter equipment during the second access. In this example, even though the mobile device may simultaneously access the datacenter equipment 230 and 240 on the second accessing instance without need of re-authentication, the mobile device may only perform data read on the accessed datacenter equipment. This limitation may be defined in configured access information in the mobile device. In this embodiment, the generated access token for the access information may be created, for example, by using a JSON Web Token (JWT) standard. In this example, the access token may further include corresponding encryption keys that are generated by the target datacenter equipment.

APIs 238 and 248 may be used by BMCs 232 and 242 to direct and control processes for monitoring and maintaining system firmware (such as RACADM utility, WS-MAN, REST web, and the like). In an embodiment, BMCs 232 and 242 may directly receive updates or control from the mobile device, directly transmits data to the mobile device, and the like. In a further embodiment, APIs 238 and 248 may facilitate implementation of updates in the information handling system with a blade server or the transfer of data from a blade server to mobile device.

In one embodiment, the initial authentication of the mobile device by the datacenter equipment utilizes short range wireless communications such as the Bluetooth, NFC, etc. For example, mobile device 260 utilizes second wireless module 264 with short range to transmit security credentials 266 to MSM transceiver circuitry 224. In this example, BMC 222 may first authenticate and/or verify the security credentials against the data in authorization scope module 226. After authentication, BMC 222 may determine and configure the access information on the mobile device using Bluetooth, NFC, etc. Next, the BMC maps the configured access information to the first and second access token lists 236 and 246 via network interface 194. Based on the mapped configured access information, the BMC receives the access token information and the encryption keys from the first and or second access token through the network interface 194. The access token and encryption keys may be received by the mobile device through short range second wireless module 264. With the received access token lists 236 and 246 and encryption keys 268, mobile device 260 utilizes first wireless module 262 with long range to establish wireless communications with the datacenter equipment 230 and 240.

In an event where the access information, the corresponding access token lists, and the encryption keys are pre-existing in authorization scope module 226, the BMC 222 may directly send the corresponding access token and the encryption keys after the access information are configured on the authenticated mobile device. The security credential, for example, includes a media access control (MAC) address, an internet protocol (IP) address, a unique identifier for mobile device such as International Mobile Station Equipment identity (IMEI) or the like, and other information for identifying the mobile device.

In an embodiment, encryption key 268 stores the encryption keys that represent a symmetrical encryption key for private-private key communication, or an asymmetrical encryption key for public/private key communication, such as an asymmetrical encryption key according to a public key infrastructure (PKI). In this embodiment, the encryption keys may originate from the first and or second token list. As such, the respective datacenter equipment may be able to decrypt the encryption keys that may be used by the mobile device to simultaneously access and control some or all the datacenter equipment.

For example, the target datacenter equipment receives a polling signal from a particular IP address that is associated with the mobile device 260. In this example, the datacenter equipment is aware of the access information associated with the particular IP address of the mobile device. Based from this information, the datacenter equipment may accept the polling signal after decrypting the access token, user credentials, user authorizations, etc. associated with the mobile device. The datacenter is understood to include hundreds, if not thousands, of server racks similar to server rack 210, and that each server rack may include datacenter equipment similar to datacenter equipment 220, 230, and 240.

Figure 3:
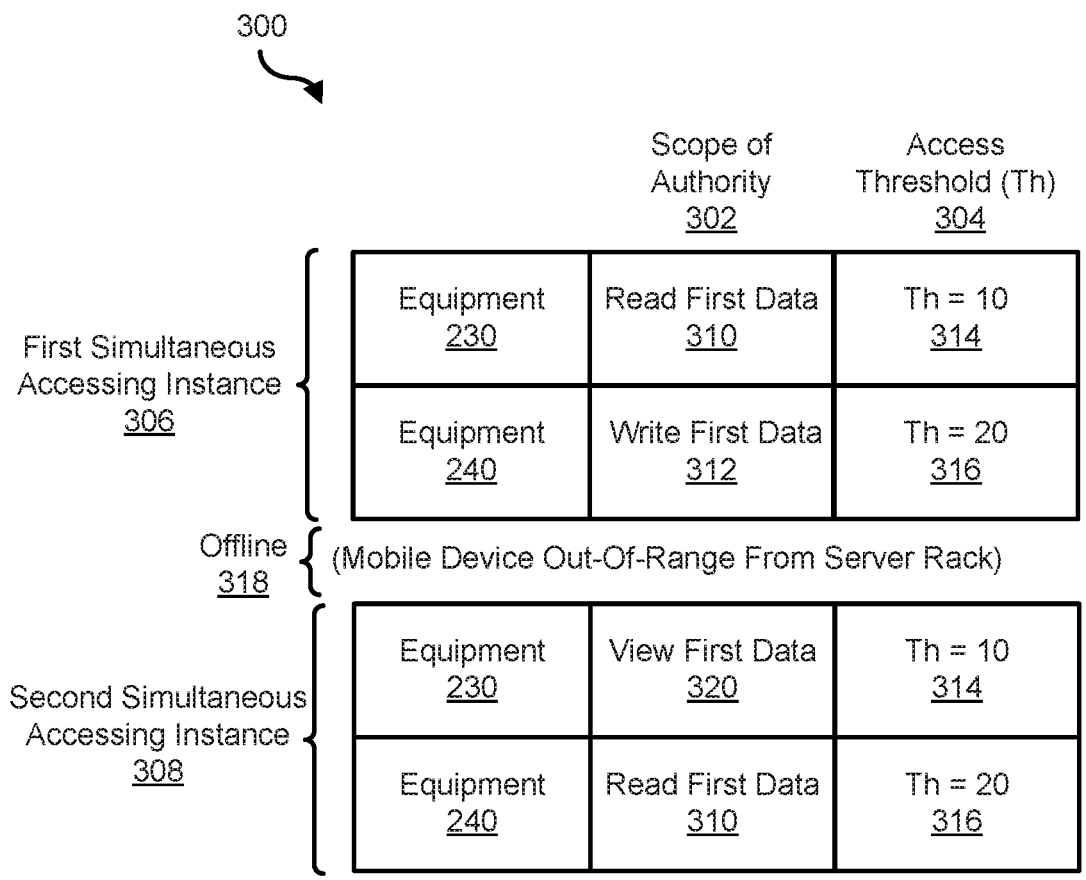
FIG. 3 is a table showing mapping of configured access information, according to an embodiment of the present disclosure.

FIG. 3 shows access information mapping 300 that includes details of scope of authority of the mobile device to manage the accessed datacenter equipment at each accessing instance. The access information mapping 300 shows scope of authority 302, and access threshold (Th) 304, during a first simultaneous accessing instance 306 and a second simultaneous accessing instance 308 of the datacenter equipment 230 and 240. The first and second simultaneous accessing instances may utilize the same access token and encryption keys. However, at the second and subsequent simultaneous accessing instance 308, a re-authentication of the mobile device security credential is not required. That is, the mobile device may use the same access token and encryption keys to simultaneously and remotely access the equipment in the server rack.

In an embodiment and during the first simultaneous accessing instance 306, the mobile device is limited to perform read first data 310 on the accessed datacenter equipment 230. In this embodiment, the mobile device may control some or all elements of the accessed datacenter equipment. For example, elements of the datacenter equipment may include processors 102 and 104, memory 120, graphics interface 130, etc. of the information handling system. Similarly and during the first simultaneous accessing instance 306, the mobile device is limited to perform write first data 312 on the accessed datacenter equipment 240. Thresholds 314 and 316 may limit the number of accessing instances of the datacenter equipment 230 and 240, respectively. For example, the mobile device can access the datacenter equipment 230 ten times only (Th=10) while it can access the datacenter equipment 240 twenty times (Th=20). In this example, the datacenter equipment may use a counter to count the number of accessing instances and the counted number is compared to the threshold by the datacenter equipment.

The mobile device goes offline 318 when it is out-of-range of the server rack. For example, the second wireless module 264, (with short range access) of the mobile device cannot establish wireless communication signals (such as Bluetooth or NFC signals) with the transceivers of the equipment in the server rack. In an embodiment and during the second or subsequent simultaneous accessing instance 308, the mobile device may use the same access token and encryption keys to simultaneously access the datacenter equipment without the need of reauthorization or re-authentication as long as it is within the threshold limit to access the equipment. Furthermore, the mobile device may include a different scope of authority during the second simultaneous accessing instance 308. For example, the mobile device is limited to perform view first data 326 on the datacenter equipment 230 while it can perform again the write first data 312 on the datacenter equipment 240.

Figure 4:
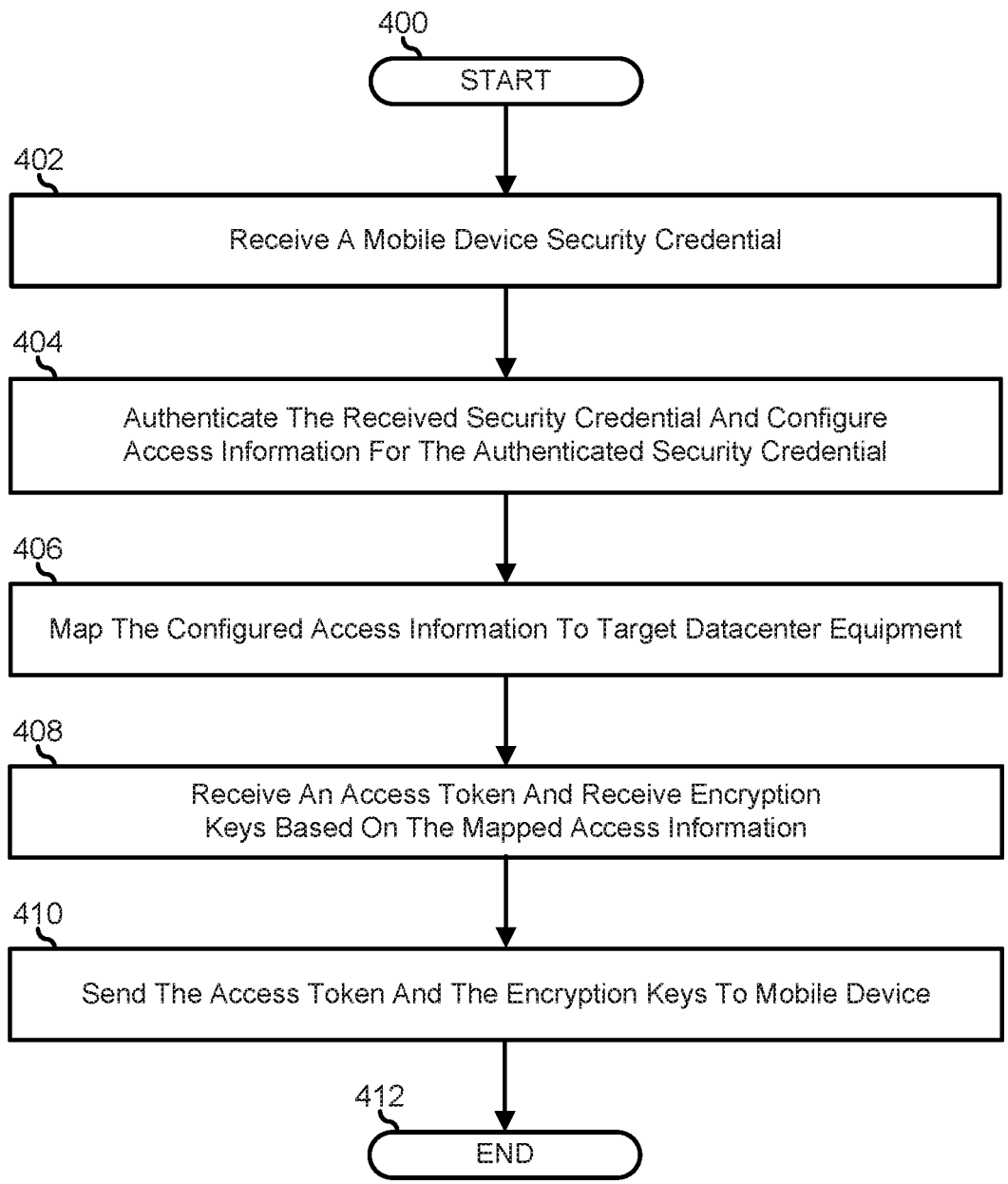
FIG. 4 is a flowchart illustrating a method for mapping configured access information to equipment in the datacenter according to an embodiment of the present disclosure.

FIG. 4 illustrates a method for providing comprehensive remote authorization to simultaneously access multiple equipment by a mobile device, starting at block 400. In block 402, MSM-datacenter equipment receives mobile device security credential. For example, a user uses an open manage mobile (OMM) app that sends a request to the MSM-datacenter equipment to access target datacenter equipment such as the first blade server and or the second blade server. Here, the MSM-datacenter equipment is disposed within the rack server or within short range wireless connection from the mobile device. In block 404, the MSM-datacenter equipment authenticates the security credential of the mobile device and configures access information that may be associated with the authenticated security credential. In block 406, the MSM-datacenter equipment maps the configured access information to the target datacenter equipment. In block 408, the MSM-datacenter equipment receives access token and receives encryption keys from the targeted datacenter equipment. The access token may be based from the mapped access information. Furthermore, each blade server or equipment may send a different access token and encryption keys in response to the mapped configured access information. In block 410, the MSM-datacenter equipment sends the access token and sends the encryption keys to the OMNI app of the mobile device. The mobile device may use the access token and the encryption keys at initial simultaneous access of the blade servers, at a second simultaneous access, and so on, when the mobile device is within short wireless communications range of the server rack 200. However, the scope of authorization to manage the blade server during the initial simultaneous access, second simultaneous access, and so on, may be defined and limited by the configured access information. For example, the configured access information includes the access information mapping 300.

In another embodiment, the MSM-datacenter equipment is preconfigured to include the access information and corresponding access token and encryption keys for the mobile device. For example, the MSM-datacenter equipment receives and stores these access token and encryption keys from multiple target blade servers. In this example, the MSM-datacenter equipment, which is assumed to be within distance of the mobile device, may receive the security credentials of the mobile device, authenticates the security credentials, configures the access information, and sends directly to the mobile device the access token and encryption keys that correspond to the configured access information.

In another embodiment, the MSM-datacenter equipment is not within wireless connection range from the mobile device. In this embodiment, the respective BMCs of blade servers may perform the authentication of the connecting mobile device, perform the configuring of the associated access information, and the BMCs may send corresponding access token and the encryption keys to the OMNI app of the mobile device. Here, the first and second access token lists of the respective BMCs are preconfigured to store the access information, access token, encryption keys, mobile device identifications, etc. In this embodiment still, blade servers that are not covered by the configured access information may remain to be in low power mode.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware.

An information handling system can also include one or more computer-readable medium for storing machine-executable code, such as software or data. Additional elements of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware elements.

In accordance with various embodiments of the present disclosure, the methods described herein may be implemented by software programs executable by a computer system. Further, in an exemplary, non-limited embodiment, implementations can include distributed processing, object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for providing comprehensive remote authorized access to a plurality of equipment in a datacenter, the method comprising:
   receiving a mobile device security credential;
   authenticating the received security credential;
   configuring access information on the mobile device;
   mapping the configured access information to the equipment in the datacenter;
   receiving an access token and receiving encryption keys from each one of the equipment;
   sending the access token and the encryption keys that are used by the mobile device to simultaneously access the equipment, and to manage the accessed equipment based on the configured access information, wherein the managing of the accessed equipment includes different thresholds on a number of times that the mobile device accesses the equipment without requiring another authentication, wherein a first equipment may be accessed a first number of times without requiring another authentication, and a second equipment may be accessed a second number of times without requiring another authentication;
   detecting that the mobile device is offline, wherein the mobile device is detected as being offline based on transceivers of the equipment not establishing wireless communication with the mobile device;
   re-establishing communication with the mobile device after the mobile device has been offline;
   in response to the re-establishing communication, determining whether the first and second number of times have been exceeded;
   in response to the first number of times not being exceeded, granting access of the first equipment without requiring another authentication of the mobile device; and
   in response to the second number of times not being exceeded, requiring another authentication of the mobile device before granting access of the second equipment.

2. The method of claim 1, wherein the simultaneous access includes parallel access of the equipment on a next accessing instance without requiring another authentication.

3. The method of claim 1, wherein the configured access information includes a different scope of authority at the next accessing instance.

4. The method of claim 1, wherein the configured access information corresponds to the authenticated mobile device security credential.

5. The method of claim 1, wherein the configuring of the access information is performed by management system module (MSM)-datacenter equipment.

6. The method of claim 5, wherein the receiving of the mobile device security credential by the MSM-datacenter equipment is performed using a short-range wireless interface.

7. The method of claim 1, wherein the mapping of the configured access information is performed through a private virtual local access network (VLAN).

8. The method of claim 7, wherein the access token and the encryption keys are received through the private VLAN and sent to the mobile device through a short-range wireless interface.

9. The method of claim 1, wherein the simultaneous accessing of the equipment utilizes a Wi-Fi interface.

10. An information handling system for providing comprehensive remote authorized access to a plurality of equipment in a datacenter, the information handling system comprising:
    a baseboard management controller configured to:
    receive through a short-range wireless interface a mobile device security credential;
    authenticate the mobile device security credential;
    configure access information on the mobile device using the short-range wireless interface;
    map the configured access information to the equipment using a private virtual local access network (VLAN);
    receive an access token and receive encryption keys from each one of the equipment through the private VLAN;
    send the access token and the encryption keys to the mobile device using the short-range wireless interface, wherein the mobile device utilizes the access token and encryption keys to simultaneously access the equipment using a long-range wireless interface, and to manage the accessed equipment based on the configured access information, wherein the managing of the accessed equipment includes different thresholds on a number of times that the mobile device accesses the equipment without requiring another authentication, wherein a first equipment may be accessed a first number of times without requiring another authentication, and a second equipment may be accessed a second number of times without requiring another authentication;

detect that the mobile device is offline, wherein the mobile device is detected as being offline based on transceivers of the equipment not establishing wireless communication with the mobile device;

re-establish communication with the mobile device after the mobile device has been offline;

in response to the re-establishing communication, determine whether the first and second number of times have been exceeded;

in response to the first number of times not being exceeded, grant parallel of the first equipment without requiring another authentication of the mobile device; and in response to the second number of times not being exceeded, require another authentication of the mobile device before granting access of the second equipment.

11. The information handling system of claim 10, wherein the security credential includes user identification, a media access control address, an internet protocol address, or a unique identifier, of the mobile device.

12. The information handling system of claim 10, wherein the access information includes different scope of authority for each accessed equipment.

13. The information handling system of claim 10, wherein the simultaneous access includes a parallel access of the equipment on a next accessing instance without requiring another authentication.

14. The information handling system of claim 10, wherein the simultaneous accessing of the equipment utilizes a Wi-Fi interface.

15. The information handling system of claim 10, wherein the access token is generated by using a JSON Web Token standard.

16. A method for providing comprehensive remote authorized access to a plurality of pieces of equipment in a datacenter, the method comprising:

receiving a mobile device security credential;

authenticating the mobile device security credential;

configuring access information on the authenticated mobile device, the configured access information including a different scope of authority for each piece of the equipment;

mapping the configured access information to the pieces of equipment;

receiving an access token and receiving encryption keys from each piece of the equipment;

sending the access token and encryption keys to the mobile device, wherein the mobile device uses the access token and encryption keys to simultaneously access the pieces of equipment, and to manage the accessed equipment based on the configured access information, wherein the managing of the accessed equipment includes different thresholds on a number of times that the mobile device accesses the equipment without requiring another authentication, wherein a first equipment may be accessed a first number of times without requiring another authentication, and a second equipment may be accessed a second number of times without requiring another authentication;

detecting that the mobile device is offline, wherein the mobile device is detected as being offline based on transceivers of the equipment not establishing wireless communication with the mobile device;

re-establishing communication with the mobile device after the mobile device has been offline;

in response to the re-establishing communication, determining whether the first and second number of times have been exceeded;

in response to the first number of times not being exceeded, granting access of the first equipment without requiring another authentication of the mobile device; and in response to the second number of times being exceeded, requiring another authentication of the mobile device before granting access of the second equipment.

17. The method of claim 16, wherein the receiving of the mobile device security credential, the configuring of the access information, and the sending of the access token and the encryption keys, are performed using a short-range wireless interface.

18. The method of claim 16, wherein the simultaneous accessing of the equipment utilizes a Wi-Fi interface.

19. The method of claim 16, wherein the access token is generated by using a JSON Web Token standard.

* * * * *

UNITED STATES PATENT AND TRADEMARK OFFICE
CERTIFICATE OF CORRECTION

| | | |
|---|---|---|
| PATENT NO. | : 11,496,454 B2 | Page 1 of 1 |
| APPLICATION NO. | : 16/263712 | |
| DATED | : November 8, 2022 | |
| INVENTOR(S) | : My Tran et al. | |

It is certified that error appears in the above-identified patent and that said Letters Patent is hereby corrected as shown below:

In the Claims

Column 14, Line 14:
Please change "second number of times not being" to --second number of times being--

Column 15, Line 20:
Please change "second number of times not being" to --second number of times being--

Signed and Sealed this
Eighteenth Day of March, 2025

Coke Morgan Stewart
*Acting Director of the United States Patent and Trademark Office*